(12) United States Patent
Holland

(10) Patent No.: US 9,459,407 B2
(45) Date of Patent: Oct. 4, 2016

(54) RING COMBINER

(71) Applicant: OFS Fitel, LLC, Norcross, GA (US)

(72) Inventor: William R Holland, Upper Black Eddy, PA (US)

(73) Assignee: OFS FITEL, LLC, Norcross, GA (US)

(*) Notice: Subject to any disclaimer, the term of this patent is extended or adjusted under 35 U.S.C. 154(b) by 269 days.

(21) Appl. No.: 14/206,828

(22) Filed: Mar. 12, 2014

(65) Prior Publication Data

US 2014/0270644 A1 Sep. 18, 2014

Related U.S. Application Data

(60) Provisional application No. 61/787,283, filed on Mar. 15, 2013.

(51) Int. Cl.
*G02B 6/14* (2006.01)
*H01S 3/094* (2006.01)
*G02B 27/09* (2006.01)
*G02B 6/42* (2006.01)
*G02B 27/14* (2006.01)
*G02B 6/10* (2006.01)
*H01S 3/067* (2006.01)

(52) U.S. Cl.
CPC .......... *G02B 6/14* (2013.01); *G02B 27/0994* (2013.01); *H01S 3/094057* (2013.01); *G02B 6/10* (2013.01); *G02B 6/4206* (2013.01); *G02B 27/14* (2013.01); *H01S 3/06733* (2013.01); *H01S 3/094053* (2013.01)

(58) Field of Classification Search
CPC .......... G02B 6/14; H01S 3/094057
See application file for complete search history.

(56) References Cited

U.S. PATENT DOCUMENTS

| | | | | |
|---|---|---|---|---|
| 4,200,356 A * | 4/1980 | Hawkes | ............... | G02B 6/2808 385/43 |
| 5,964,644 A * | 10/1999 | Rhoades | ................... | B24C 1/06 451/28 |
| 6,219,480 B1 * | 4/2001 | Cassarly | .............. | G02B 6/2804 385/31 |
| 6,385,371 B1 * | 5/2002 | Li | ......................... | G02B 6/2804 385/121 |
| 6,956,876 B1 * | 10/2005 | Aquaro | .................. | G02B 6/305 372/6 |
| 2007/0237453 A1 * | 10/2007 | Nielsen | .............. | G02B 6/02004 385/28 |
| 2009/0202204 A1 * | 8/2009 | Nielsen | ................ | G02B 6/2551 385/43 |
| 2011/0002584 A1 * | 1/2011 | Griffin | ..................... | A61B 8/24 385/43 |
| 2013/0287338 A1 * | 10/2013 | Majid | ................... | G02B 6/2843 385/31 |

* cited by examiner

*Primary Examiner* — Charlie Y Peng
(74) *Attorney, Agent, or Firm* — Sam Han, Esq.

(57) ABSTRACT

A waveguide comprises an annular cross-section and a first numerical aperture (NA) at one end. The waveguide further comprises either an annular or circular cross-section at the other end, which has a second NA. The waveguide has a progressively-varying NA, which varies from the first NA (at one end) to the second NA (at the other end).

8 Claims, 4 Drawing Sheets

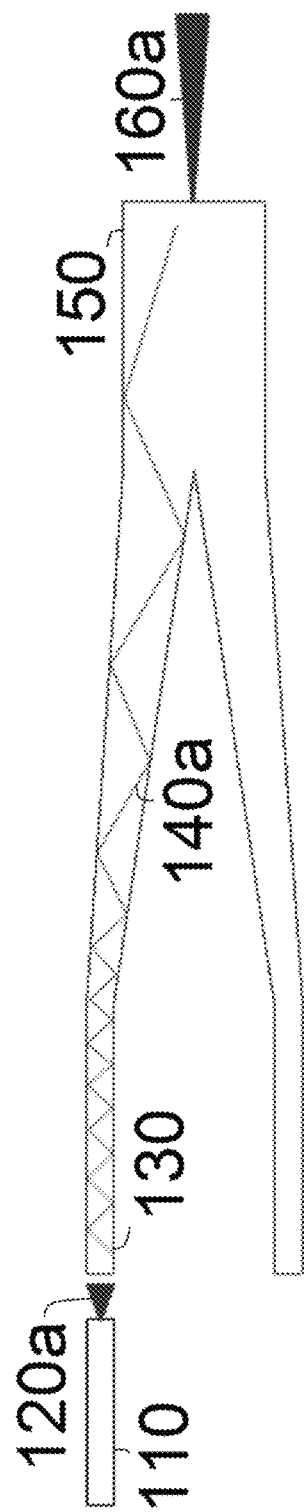
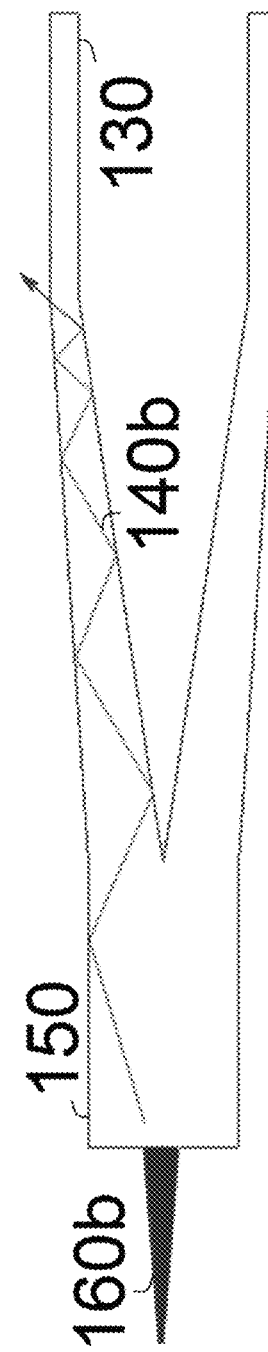
FIG. 1A
FIG. 1B

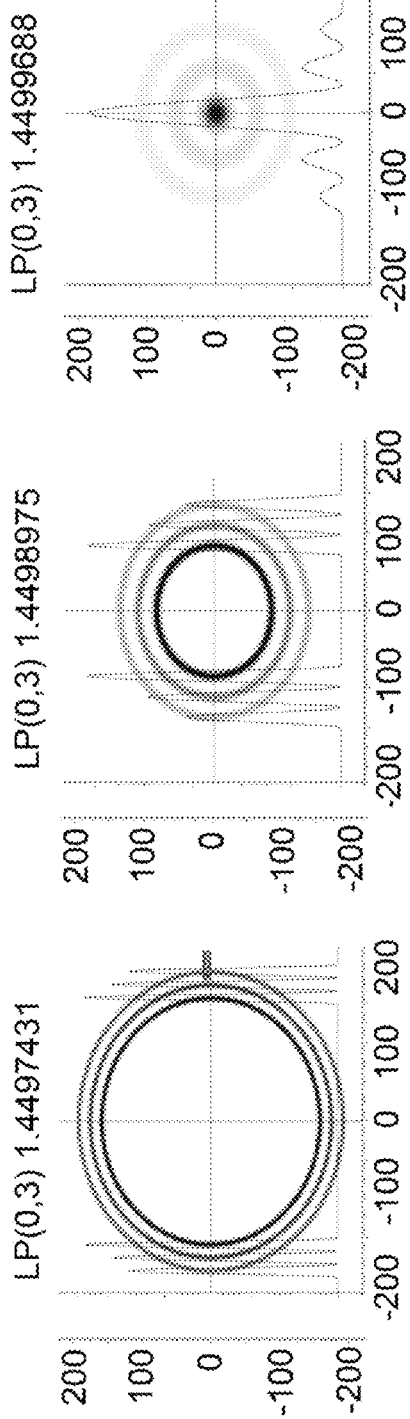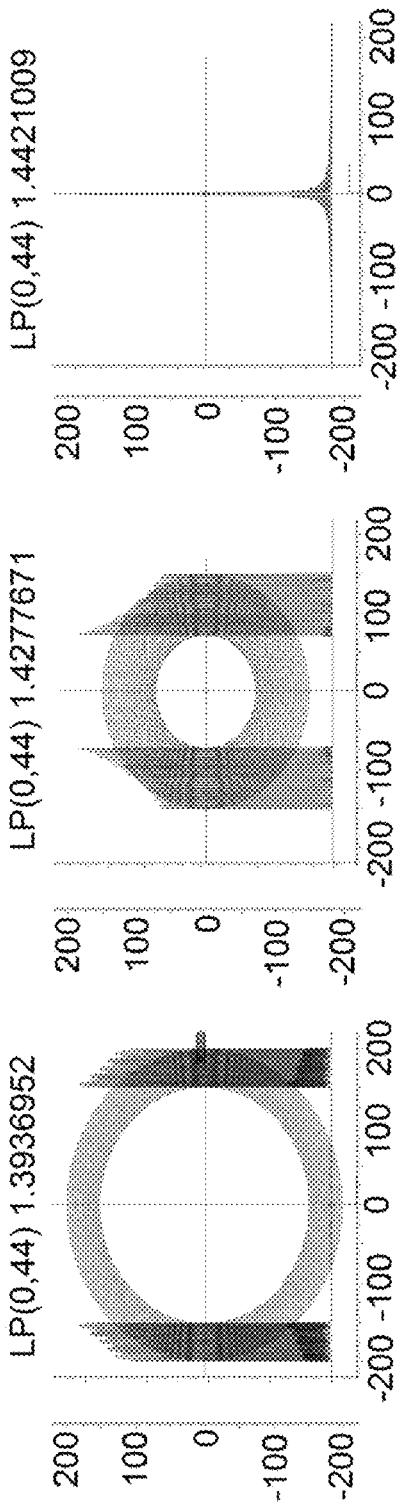

RING COMBINER

CROSS REFERENCE TO RELATED APPLICATIONS

This application claims the benefit of U.S. provisional patent application Ser. No. 61/787,283, filed 2013 Mar. 15, by Holland, having the title "Collapsible Ring Combiner," which is incorporated herein by reference in its entirety.

BACKGROUND

1. Field of the Disclosure

The present disclosure relates generally to waveguides and, more particularly, to optical waveguides.

2. Description of Related Art

Optical devices for high power applications often invoke some manner of dimensional scale-down of the optical waveguide boundaries, for the purpose of concentrating or combining power into a smaller fiber guide. For example, a tapered fiber bundle forms a composite waveguide of fused fibers, which is then tapered to reduce its diameter. Unfortunately, this tapering results in an increase of the numerical aperture (NA) of the beam. Thus, in order to prevent loss of light in these types of tapered waveguides, the NA at an input must be sufficiently small that any eventual increase in NA does not exceed a critical angle and the waveguide maintains total internal reflection.

SUMMARY

The present disclosure provides a waveguide comprising an annular cross-section and a first numerical aperture (NA) at one end. The waveguide further comprises either an annular or circular cross-section at the other end, which has a second NA. The waveguide produces a progressively-varying NA, which varies from the first NA (at one end) to the second NA (at the other end).

Other systems, devices, methods, features, and advantages will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIG. 1A is a side view of one embodiment of a ring combiner, which has an annular cross-section at an input end, and a circular cross-section at an output end.

FIG. 1B is a side view of one embodiment of a ring combiner, which has a circular cross-section at an input end, and an annular cross-section at an output end.

FIGS. 4A, 4B, and 4C are graphs showing the behavior of a higher-order mode (LP03) as it propagates through the ring combiner of FIG. 1.

FIGS. 5A, 5B, and 5C are graphs showing the behavior of another higher-order mode (LP044) as it propagates through the ring combiner of FIG. 1.

DETAILED DESCRIPTION OF THE EMBODIMENTS

Figure 2:
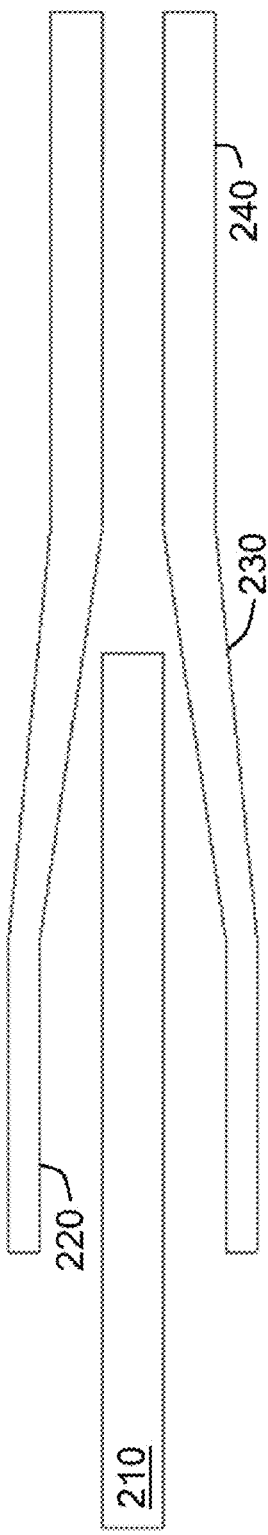
FIG. 2 is a side view of a second embodiment of a ring combiner, which has an annular cross-section at one end, and a different annular cross-section at the other end.

Optical waveguides are described by two orthogonal dimensions which govern the behavior of its allowed mode orders. For example, optical fibers are cylindrical with dimensional coordinates of radius r and azimuthal angle $\phi$. Discrete $LP_{mn}$ modes describe particular orders for both dimensions, which may be viewed as transverse path lengths forming sequential multiples of $2\pi$. As a fiber's cross-sectional area is reduced (as through tapering along length), the radial dimension decreases and a given mode transforms to having a larger radial wave vector or numerical aperture (NA).

Tapered fiber bundles provide a mechanism for concentrating optical power in high-power applications. Unfortunately, the tapering of the waveguide results in an increase in numerical aperture (NA) as the cross-sectional area of the waveguide decreases. Consequently, even when light enters the waveguide at an angle that is within the acceptance cone at the larger cross-sectional area, the increase in NA can result in the light escaping the waveguide as it travels to the smaller cross-sectional area of the waveguide. Thus, in order to avoid this type of loss, light must enter the waveguide at an entrance angle that ensures containment of the light even when the NA increases as the light propagates from larger cross-sectional area to smaller cross-sectional area.

The disclosed embodiments show a waveguide structure in which the NA of a beam (e.g., collection of modes that are sustained in the waveguide) is reduced as it propagates along the waveguide. Thus, the waveguide permits propagation of the beam without the beam escaping from the waveguide. In one embodiment, the waveguide comprises an annular cross-section at the input end, a circular cross-section at the output end, and a NA that varies progressively from the annular input end to the circular output end. Significantly, the shape of the waveguide changes from the input end to the output end in such a way that the effective cross sectional area does not decrease along the waveguide. By employing this type of ring combiner, light can be concentrated with minimal loss from the beam escaping from the waveguide.

With this general overview in mind, reference is now made in detail to the description of the embodiments as illustrated in the drawings. While several embodiments are described in connection with these drawings, there is no intent to limit the disclosure to the embodiment or embodiments disclosed herein. On the contrary, the intent is to cover all alternatives, modifications, and equivalents.

FIG. 1A is a side view of one embodiment of a ring combiner, which has an annular cross-section 130 at an input end, and a circular cross-section 160 at an output end. As shown in FIG. 1A, the cylindrical waveguide has an outer diameter of the tube that decreases along the length of the waveguide. Although an increase in NA might be expected as a result of the decreasing outer diameter, the modal character is actually determined by the increasing wall thickness as the waveguide evolves from a thin-walled annular cross-section 130 to a thicker circular cross-section 160. Thus, if the waveguide is transformed in a continuous and adiabatic manner that does not appreciably alter its area, then the annular cross-section collapses into a solid cylinder with a circular cross-section. As a result, when a source 110 injects a beam 120*a* into the waveguide, the radial path of the modes 140*a* will generally move to more shallow angles (relative to the waveguide central axis), and give rise to an overall decrease of mode angles, resulting in the beam 160*a* exiting the waveguide at a smaller angle than the entrance angle of the beam 120*a*.

In order to maintain a constant cross-sectional area over the length of the waveguide, the walls of the waveguide expand in thickness and thereby mimic an expanding waveguide that generally lowers NA. With this in mind, mathematical relations can be derived, allowing for designs based on target parameters such as input wall thickness, magnitude of NA decrease, output diameter, etc. Thus, as those skilled in the art will appreciate, the waveguide can be designed so that the NA varies progressively along the length of the waveguide, going from a higher NA to a lower NA. For other embodiments, the waveguide can be designed so that the NA remains relatively constant along the length of the waveguide.

To examine this in greater detail, FIGS. 3A through 5C illustrate the modal behavior as a beam propagates through the waveguide structure of FIG. 1. More specifically, FIGS. 3A, 3B, and 3C (collectively, FIG. 3) are graphs showing the behavior of a fundamental mode (LP01) as it propagates through the ring combiner of FIG. 1; FIGS. 4A, 4B, and 4C (collectively, FIG. 4) are graphs showing the behavior of a higher-order mode (LP03) as it propagates through the ring combiner of FIG. 1; and FIGS. 5A, 5B, and 5C (collectively, FIG. 5) are graphs showing the behavior of another higher-order mode (LP044) as it propagates through the ring combiner of FIG. 1.

For illustrative purposes, the annular cross-section 130 input has an inner diameter of 300 µm and an outer diameter of 400 µm. The illustrative waveguide is tapered so that the circular cross-section 150 output has an outer diameter of 265 µm. For this particular embodiment, the input beam has a NA of 0.40.

Figures 3A, 3B, 3C:
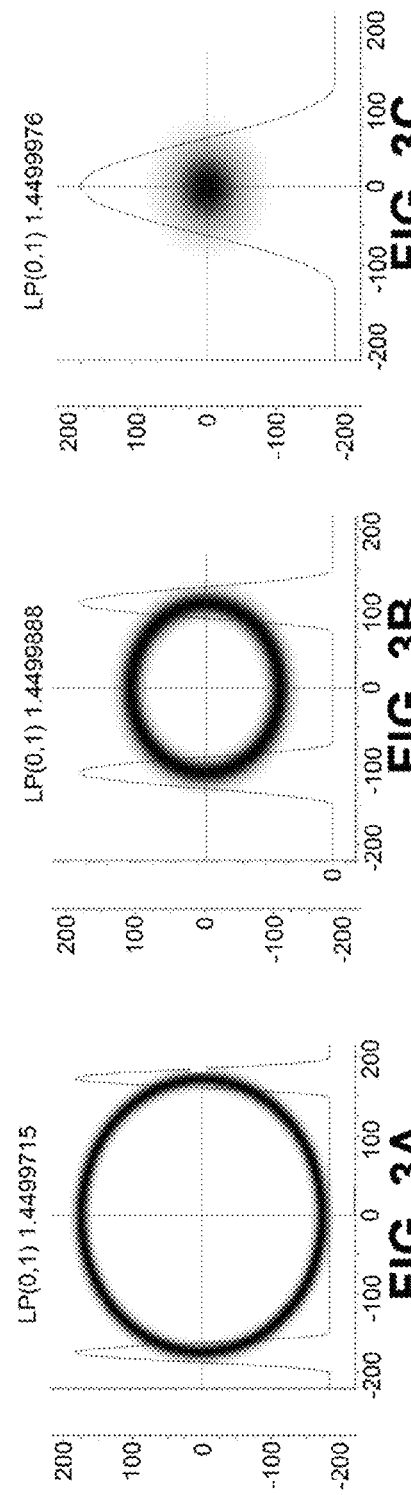
FIGS. 3A, 3B, and 3C are graphs showing the behavior of a fundamental mode (LP01) as it propagates through the ring combiner of FIG. 1.

As shown in FIG. 3, the fundamental mode (LP01) begins at the annular cross-section 130 as a ring-shaped beam (FIG. 3A). As the beam propagates along the waveguide of FIG. 1, the ring evolves into smaller diameters (FIG. 3B) that correspond to the decreasing diameter of the waveguide. Eventually, as the beam reaches the circular cross-section 150, it collapses into a fundamental mode (FIG. 3C).

In another example, as shown in FIG. 4, the LP03 higher-order mode is propagated along the length of the waveguide. The LP03 begins with three modes (FIG. 4A), evolving to a smaller-diameter (FIG. 4B), and eventually collapsing into the LP03 of FIG. 4C.

Figure 6:
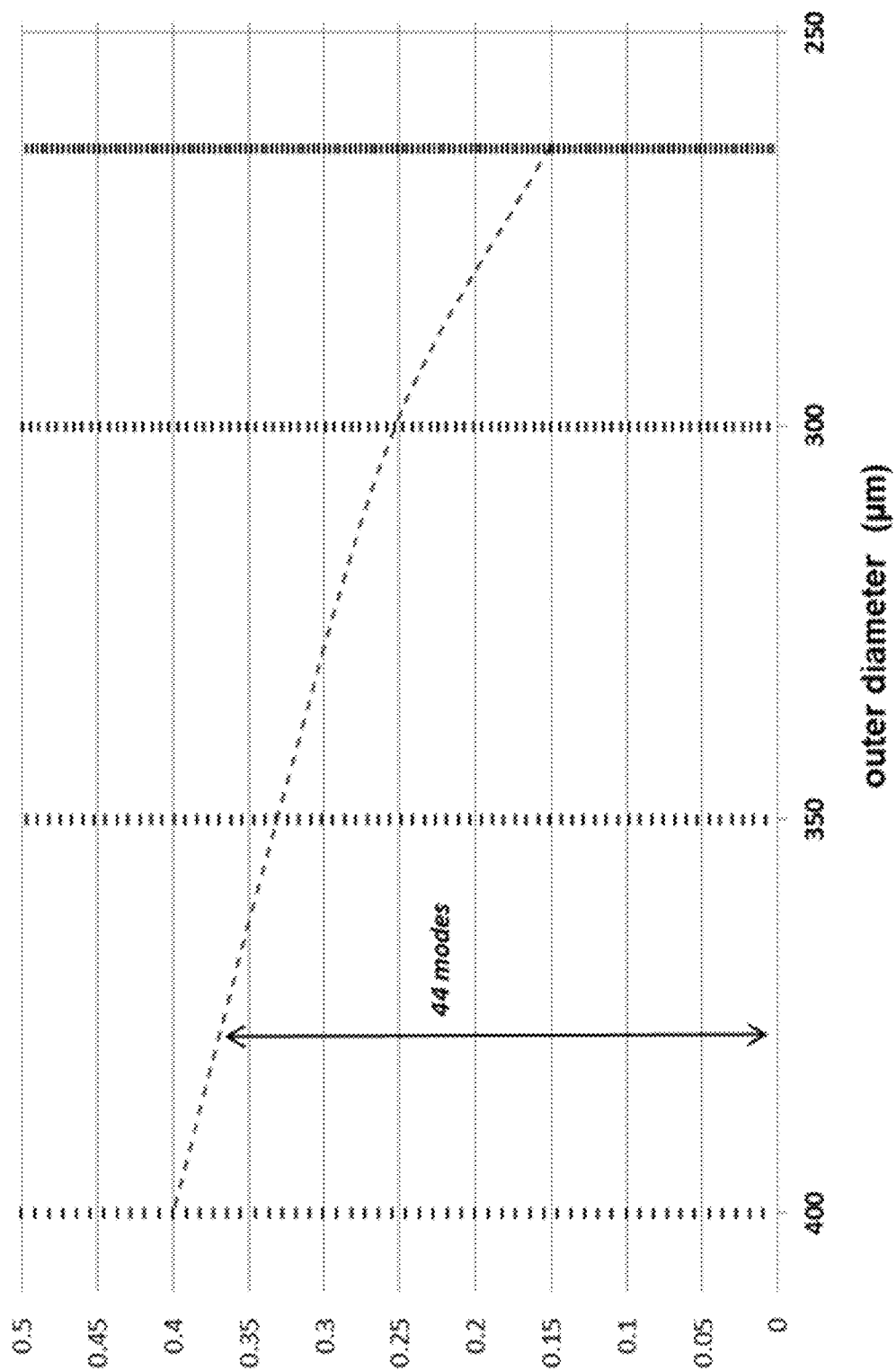
FIG. 6 is a graph showing the evolution of an LP044 beam's modal numerical aperture (NA) as the beam propagates through the ring combiner of FIG. 1

In one final example, as shown in FIG. 5, the LP044 mode is chosen because it corresponds to the highest-order mode that is excited with a numerical aperture of 0.40. As shown in FIGS. 5A, 5B, and 5C, even the LP044 mode transitions to the expected shape of the solid, circular cross-section 150 of the waveguide. The evolution of the modal NA of the LP044 mode is shown in greater detail with reference to FIG. 6. Specifically, the mode solutions for 400 µm, 350 µm, 300 µm, and 265 µm are shown in FIG. 6. Launching a beam into the 400 µm annular cross-section with a 0.40 NA will under-fill the waveguide and populate the first 44 modes. As the beam propagates, the total number of modes increases to 140 (at 350 µm), 183 (at 300 µm), and 303 (at 265 µm). As shown in FIG. 6, the lowest 44 modes comprising the beam evolve through progressively-decreasing NA, eventually exiting the waveguide at a final NA of 0.15. This reduction factor is equal to the output radius divided by the input wall thickness.

FIG. 1B is a side view of one embodiment of a ring combiner, which has a circular cross-section 150 at an input end, and an annular cross-section 130 at an output end. Thus, unlike the embodiment of FIG. 1A, the embodiment of FIG. 1B shows an input beam 160*b* that enters the waveguide, with the radial path of the modes 140*b* increasing as the beam propagates through the waveguide and eventually escaping the waveguide due to the progressively increasing NA. This type of structure can be employed for pump blocking or other applications in which removal of light from the waveguide is desired. For example, the embodiment of FIG. 1B (from lower-NA circular to higher-NA annular) can be used to filter signal light and prevent it from reaching diode light sources. Any cladding light emanating from a gain fiber will enter the waveguide of FIG. 1B, propagate from lower-NA to higher-NA, and thus be rejected from entering the lower NA pump pigtails attached to the waveguide of FIG. 1B.

FIG. 2 is a side view of yet another embodiment of a ring combiner, which has an annular cross-section 220 at one end, and a different annular cross-section 240 at the other end. Unlike the embodiment of FIG. 1A, the embodiment of FIG. 2 does not collapse into a solid cylinder but, instead, collapses into a thicker-walled ring structure as it transitions 230 from one annular cross-section 220 to the other annular cross-section 240. The embodiment of FIG. 2 provides a center opening, which permits insertion of a signal fiber 210 that can be fused within the thicker annular cross-section 220 to yield a solid output end similar to FIG. 1A. The output would then be suitable for coupling to a gain or passive fiber. Thus, the structure of FIG. 2 permits combining of pump (through the ring combiner) and signal (through the signal fiber 210).

With the behavior of the beam in FIGS. 3 through 5 in mind, the structures of FIG. 1A, 1B, or 2 can be used in numerous different applications. For example, one application for the structure of FIG. 1A is combining pump light from a large number of diode sources into a common fiber containing a low NA beam. Normally, the beam NA from fiber pigtailed diodes is in the range of approximately 0.12 to approximately 0.22. A configuration similar to that of FIG. 1A can be used to increase the number of combined diodes by first forming a circular arrangement of input fibers to match the ring shape of the waveguide. A simple calculation reveals that with sources first combined in the conventional way to increase the NA to approximately 0.40, the waveguide of FIG. 1 can be used to transmute the light into a beam or smaller fiber with a lower NA of approximately 0.15. Alternatively, if the waveguide is structured so that there is not an appreciable change in NA between the input and the output, then a lower NA input beam can be used. In yet another embodiment, the circular cross-section 150 can be further tapered so that an input beam with a 0.15 NA will decrease as it reaches the circular cross-section, and then increase back to 0.15 NA as it propagates through the taper.

The embodiment of FIG. 1A can also be used for pumping fiber lasers. For those types of applications, high NA pump light is launched into a double-clad fiber. This can be done by preceding and following the waveguide of FIG. 1A by a normal NA-increasing combining operation, which would yield an output fiber with high NA light that is suitable for coupling directly into a double-clad fiber.

The embodiment of FIG. 1A can also be used for multi-mode and single-mode amplifiers. For multi-mode amplifiers, the waveguide of FIG. 1A lowers the NA of the output from an amplifier or laser. For example, the light source for illuminating into the ring combiner (FIG. 1A) would be derived from a rare-earth gain fiber, which uses a ring shaped mode that is sized to match the ringer combiner input. The ring combiner (FIG. 1A) enables the multi-mode amplifier to possess a higher NA core (approximately 0.22) and a larger area (approximately 25 µm²), which can be transmuted to a lower NA of approximately 0.08 and a multimode core. If the gain fiber is designed to have a hollow core, then the ring combiner (FIG. 1A) can be fabricated directly onto the end. For single-mode amplifiers, an illuminating light source is derived from a rare-earth gain fiber using a ring shaped mode. However, for single-mode operation, the wall thickness of the ring is much thinner (e.g., approximately 6 µm). The ring combiner (FIG. 1A) carries only the fundamental mode with NA of approximately 0.08. After coupling through the ring combiner (formed at the fiber tip or as a separate element) the amplified mode is reduced to a very low NA (e.g., approximately 0.03). This mode is essentially the fundamental mode of the large solid core output of the ring combiner (FIG. 1A).

The ring combiner of FIG. 1A can also be used as a mode converter. For mode conversion applications, the ring combiner enables coupling of a fundamental mode into the ring-shaped cores. For example, a fiber amplifier or laser cavity can be formed by using the ring combiner to inject a seed signal or add grating reflectors.

A ring-shaped gain fiber for illuminating the ring combiner of FIG. 1A or 2 can be formed by fabricating a core of large diameter (approximately 50 µm to approximately 100 µm in diameter) with a wall thickness of approximately 5 µm to approximately 10 µm. Such a core would be doped with rare earth elements and could contain quite high concentrations to produce a very high NA (e.g., approximately 0.22). The gain fiber can further be configured with either a solid, hollow, or otherwise low-index center using a low density glass structure. This design provides for a very large modal effective area and a small cladding cross-section, making ideal conditions for double-clad pumping with high cladding absorption. Mode mixing could also be provided by shaping the inner surface, making the round outer diameter easier to cleave.

As shown herein, by using this type of ring combiner (FIGS. 1A and 2), light can be concentrated with minimal loss due to the beam escaping from the waveguide. This permits the use of the ring combiner (FIGS. 1A, 1B, and 2) in numerous different optics-related applications.

Although exemplary embodiments have been shown and described, it will be clear to those of ordinary skill in the art that a number of changes, modifications, or alterations to the disclosure as described may be made. All such changes, modifications, and alterations should therefore be seen as within the scope of the disclosure.

What is claimed is:

1. An apparatus, comprising:
   a first end guiding light having a first numerical aperture (NA), the first end further having an annular cross-section;
   a second end guiding light having a second NA, the first NA being greater than the second NA, the second end further having a circular cross-section; and
   a waveguide between the first end and the second end, the waveguide producing a varying NA that progressively transitions from the first NA to the second NA, the waveguide having a length, the waveguide further having an effective cross sectional area that does not decrease along the length of the waveguide, the waveguide further having a decreasing outer diameter from the first end to the second end.

2. The apparatus of claim 1, the first end being an input, the second end being an output.

3. The apparatus of claim 1, the first end being an output, the second end being an input.

4. The apparatus of claim 1, the waveguide comprising a varying cross-section that progressively transitions from the annular cross-section to the circular cross-section.

5. An apparatus, comprising:
   a first end guiding light having a first numerical aperture (NA), the first end further having a first annular cross-section;
   a second end guiding light having a second NA, the first NA being greater than the second NA, the second end further having a second annular cross-section; and
   a waveguide between the first end and the second end, the waveguide producing a varying NA that progressively transitions from the first NA to the second NA, the waveguide having a length, the waveguide further having an effective cross sectional area that does not decrease along the length of the waveguide, the waveguide further having a decreasing outer diameter from the first end to the second end.

6. The apparatus of claim 5, the first end being an input, the second end being an output.

7. The apparatus of claim 5, the first end being an output, the second end being an input.

8. The apparatus of claim 5, the waveguide comprising a varying cross-section that progressively transitions from the first annular cross-section to the second annular cross-section.

\* \* \* \* \*